United States Patent [19]

Klingel

[11] Patent Number: 4,675,501

[45] Date of Patent: Jun. 23, 1987

[54] LASER APPARATUS WITH NOVEL BEAM ALIGNING MEANS AND METHOD OF LASER PROCESSING OF WORKPIECES USING SAME

[75] Inventor: Hans Klingel, Moglingen, Fed. Rep. of Germany

[73] Assignee: Trumpf GmbH & Co., Ditzingen, Fed. Rep. of Germany

[21] Appl. No.: 663,239

[22] Filed: Oct. 22, 1984

[51] Int. Cl.$^4$ .............................................. B23K 26/00
[52] U.S. Cl. ................. 219/121 LG; 219/121 LU; 219/121 LV; 219/121 LZ
[58] Field of Search ............... 219/121 LG, 121 LN, 219/121 LZ, 121 LX, 121 LU, 121 LV, 121 L, 121 LM

[56] References Cited

U.S. PATENT DOCUMENTS 3,902,036  8/1975  Zaleckas ..................... 219/121 LX
4,417,123  11/1983  Keller et al. ................. 219/121 LZ

FOREIGN PATENT DOCUMENTS

0025594  3/1981  European Pat. Off. ...... 219/121 LZ
0077989  6/1980  Japan .......................... 219/121 LZ
2083217  3/1982  United Kingdom ......... 219/121 LX

*Primary Examiner*—M. H. Paschall

[57] ABSTRACT

A laser beam apparatus for processing workpieces includes a beam transmission system providing a beam pathway therethrough from the laser beam generator to a laser focusing head, and this system has at least one mirror which reorients the direction of the beam in the pathway and which is adjustable in at least one axis relative to the pathway. At a point downstream of the mirror is a laser beam sensing means which senses deviation of the beam from its optimum path and generates a signal which is transmitted to deviation responsive means to provide an output. This output may include a visual indicator which enables the operator to effect manually the necessary adjustment of the mirror or an automatic operating means for effecting corrective movement of the mirror. The apparatus has a laser cutting head containing a beam directing mirror and the focusing lens with a deviation sensing means therebetween. This is movable along two axes which are perpendicular to each other, it may also be pivotable about one of the axes, and it may also be movable along a third axis perpendicular to the first two axes.

21 Claims, 7 Drawing Figures

LASER APPARATUS WITH NOVEL BEAM ALIGNING MEANS AND METHOD OF LASER PROCESSING OF WORKPIECES USING SAME

BACKGROUND OF THE INVENTION

The present invention is directed to machines for laser processing of workpieces, and more particularly, to such machines which utilize a laser beam for cutting, welding and the like and which provide means for alignment of mirrors in a beam transmission system therein.

Lasers are now fairly widely employed in apparatus for the processing of workpieces such as, for example, in cutting, welding, heat treating and the like. As is well known, the extraordinarily narrow laser beam can be used to cut parts of various shapes from a workpiece and to cut small openings within a part. Moreover, the holes cut through the part can be spaced be especially adapted to the manufacture of unique products, or small runs of products, with fairly complicated configurations through the use of suitable control mechanisms to control either the motion of the laser cutting head or the motion of the workpiece on a support table beneath the laser cutting head, or both. By changing the program in the numeric control system for the laser apparatus, the workpiece and the orientation of the various cutting operations to produce the desired part can be readily altered.

Some laser processing machines utilize a table upon which the workpiece is supported, and the workpiece is held by clamping jaws or like mechanisms and moved about the support table in X and Y directions by suitable X-Y drive mechanisms which are controlled by a computer or like control system. In still other machines, the workpiece is supported in a fixed position upon the table, and the laser head is supported for movement in X-Y directions relative to the workpiece. When the workpiece itself is being moved, frequently a relatively large mass must be moved and stopped in a precise manner. In either type of apparatus, the laser beam must be focused so as to impinge upon the workpiece at a predetermined spot.

As it well known, most laser generators include a plurality of mirrors which direct the light rays back and forth until the laser beam of desired intensity has been developed. The laser beam then exits the laser generator through a suitable shutter mechanism.

In most equipment for laser processing of workpieces, there is an optical beam transmission system providing the pathway between the output of the laser generator and the laser beam focusing head wherein the laser beam is focused by lenses to the desired point upon the workpiece. These optical transmission systems include at least one and generally several mirrors which alter the direction of travel of the laser beam and ultimately direct the laser beam into the optics of the laser beam focusing head. As is also well known, misalignment of the mirrors in this optical beam transmission system will seriously affect the power delivered to the workpiece and can in fact, cause damage to the apparatus if the beam is misaligned sufficiently to impinge upon elements of the apparatus. Accordingly, one or more mirrors within the system is usually adjustable in order to effect their realignment from time-to-time to ensure that the laser beam is transmitted along its optimum path to the focusing lens system.

In practice, it has been customary to switch the laser generator on for a short period of time and to observe the point of impingement upon a workpiece or target and then to effect such adjustment of the mirror or mirrors as is necessary to precisely align the beam exiting from the laser beam focusing head in the proper position upon the workpiece or target. Generally, this requires that the laser beam be one which is in the visible spectrum, or, when the main beam used for the laser processing of the workpiece is in the invisible or infrared range, the provision of a second beam within the visible range travelling in a parallel path. This is frequently the case with carbon dioxide lasers used for most high powered industrial applications.

As will be appreciated, industrial lasers, and particularly those used in connection with the processing of heavy workpieces, will be subject not only to vibrations and shocks generated within the apparatus itself, but also to ambient vibrations and shocks from adjacent equipment. Thus, from time-to-time, it may be necessary to effect realignment of the mirrors in the beam transmission system in order to keep the laser operating efficiently and in precise alignment with the X-Y guidance system used for moving either the laser cutting head or the workpiece.

It is an object of the present invention to provide novel laser apparatus for performing operations upon a workpiece in which misalignment of the laser beam may be readily determined and the deviation of the laser beam from its optimum pathway may be readily corrected.

It is also an object to provide such apparatus in which the correction may be effected automatically through precision control mechanisms for one or more mirrors in the beam transmission system.

Another object is to provide such apparatus which is simple and effective for laser beams in the invisible spectrum.

A further object is to provide a method for laser processing of workpieces in which precise and simple adjustment of one or more mirrors in an optical beam transmission system may be effected to correct any deviation of the laser beam from its optimum path to the laser beam focusing head.

SUMMARY OF THE INVENTION

It has now been found that the foregoing and related objects may be readily attained in laser apparatus for processing of workpieces which includes a laser beam generator, a laser beam focusing head, and a laser beam transmission system for transmitting the laser beam exiting the generator along a laser beam pathway to the focusing head. The transmission system includes at least one mirror and means mounting the mirror for movement in at least one axis. A laser beam aligning system includes at least one sensing means at a point in the laser beam pathway prior to the focusing head and actuatable by the laser beam impinging thereon to provide a signal indicative of deviation of the laser beam from its optimum path at that point in the pathway. Deviation responsive means is responsive to the signal from the sensing means and provides an output for use in effecting movement of the mirror in its axis of movement to move the laser beam to the optimum path.

In one embodiment, the deviation responsive means comprises indicating means providing information to the operator to effect manual movement of the mirror to orient the laser beam into its optimum path. In another, it comprises automatically operable regulating means for automatically effecting movement of the mirror to orient the laser beam into its optimum path.

The mirrors may be movable linearly along, or pivotable about, two axes that are perpendicular to each other, or both. Preferably, the laser beam transmission system includes two mirrors each mounted for movement in at least one axis, and two sensors. The signals generated by both of the sensing means are preferably processed by the deviation responsive means to provide an output representing the composite of the information providing by those signals.

The laser beam focusing head may be disposed in a laser cutting head which is mounted in the laser apparatus for movement along at least two axes which are perpendicular to each other. The laser cutting head may be supported on a support mechanism which itself is movable along one axis, and the laser cutting head may be movable relative to the support mechanism axis along an axis perpendicular to the first mentioned axis. The laser cutting head may be additionally movable along a third axis perpendicular to the two perpendicular axes, and it may be also pivotable about an axis parallel to one of the perpendicular axes.

The laser beam generator may have a pair of spaced exit apertures and generate a main beam of high power and an auxiliary beam of lower power. The beam of lower power is offset from the main beam and extends through the transmission system along a parallel path offset a predetermined distance, and the laser beam aligning system senses the auxiliary beam. Alternatively, the laser beam generator may include means for reducing the output power of the laser beam.

In the method of processing the workpieces, a laser beam is generated and transmitted along a beam pathway to the laser beam focusing head through a beam transmission system including at least one mirror. The laser beam is aimed by sensing at a point in the beam pathway any deviation of the beam from its optimum path thereby and generating a signal indicative of such deviation. This signal is then used to adjust the position of the mirror to move the laser beam to its optimum path.

DETAILED DESCRIPTION OF THE ILLUSTRATED EMBODIMENTS

Figure 1:
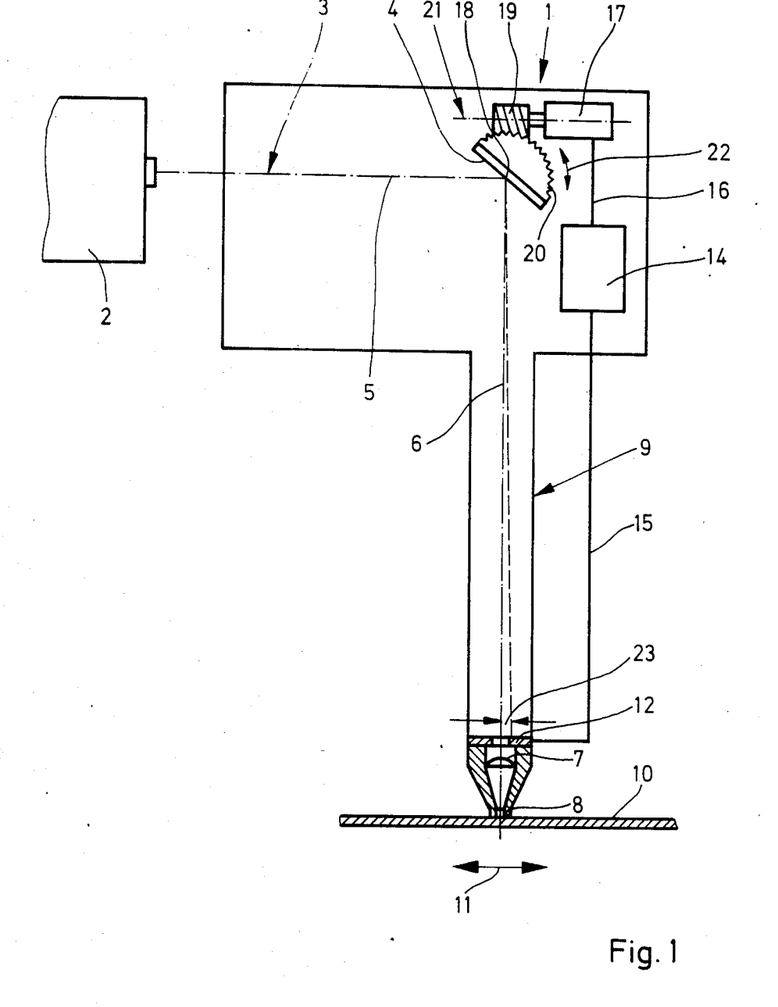
FIG. 1 is a diagrammatic view of a laser cutting apparatus embodying the present invention with the laser resonator and workpiece fragmentarily illustrated.

Turning first to FIG. 1, therein diagrammatically illustrated is a laser apparatus embodying the present invention and generally comprised of a laser work unit generally designated by the numeral 1 and a laser resonator or generator fragmentarily illustrated and designated by the numeral 2. As seen, a laser beam 3 exits the shutter of the laser resonator 2 and travels along a horizontal path designated by the numeral 5 to the mirror 4 where it is deflected or reflected at a right angle into the path illustrated in phantom line and designated by the numeral 6. This beam is directed into the laser cutting head generally designated by the numeral 9 and specifically into the focusing lens 7, and thence into the gas nozzle 8 disposed against the workpiece 10, which is indicated as a metal sheet.

As is well known, if the laser component 1 and workpiece 10 are moved relative to one another in the manner indicated by the arrow 11, a narrow kerf will be cut (or burned) in the workpiece 10, and a finished part(s) of predetermined size and shape can be cut from the metal sheet. Alternatively, the workpiece 10 and the laser work unit 1 can be moved relative to one another, and the laser beam 3 generated only after each movement so that a series of spaced holes are burned in the workpiece 10.

In the preferred type of apparatus, the workpiece 10 is clamped in a suitable workpiece guidance system on a support table (not shown), and the workpiece 10 is moved by the guidance system relative to the stationary cutting head 9 along X and Y axes. Not shown is the control system for the overall apparatus to effect the relative movement and to operate the laser resonator as required for the cutting operation.

To effect and ensure the proper alignment of the laser beam 3 in the focusing lens 7 and the laser nozzle 8, there is provided an aligning system including a sensor or testing device 12 disposed in the laser beam pathway 6 adjacent the focusing lens 7. The sensor 12 determines whether there is any deviation of the laser beam 3 from the optimum pathway indicated by the phantom (dot-dash) line 6, an examplary deviation being indicated by the broken line and the spacing defined by the arrows 23. The optimum pathway is centrally of the aperture through the sensor 12 which is aligned with the optical center of the focusing lens 7. The sensor 12 generates a signal which is transmitted through the circuit connection 15 to the control means or calculator 14.

In this embodiment, the control means 14 is in turn connected by the circuit means 16 to motor operators 17 (only one of which is shown) which are operable to effect movement of the mirror 4 in one or more axes. In the specifically illustrated embodiment, the motor 17 effects rotation of a lead screw 19 about its axis 21, and the lead screw 19 is in engagement with gear teeth of a gear mechanism 20 coupled to the mirror 4 to effect its pivotal movement about the axis 18. The pivotal movement which the motor operator 17 and lead screw 19 will effect is indicated by the double headed arrow 22. A second motor operator and gear mechanism (not shown) will effect pivotal movement of the mirror 4 about an axis perpendicular to the axis 18 (in the plane of the paper). In the event that the sensor 12 determines that the beam 3 deviates from the optimum path as indicated by the broken line and the spacing 23 in FIG. 1, the control means 14 will respond to the signal generated thereby and actuate the motor operators 17 to effect the desired pivotal movement of the mirror 4 about its axes 18 so as to bring the laser beam 3 back to the optimum path 6 shown in phantom line.

Figure 2:
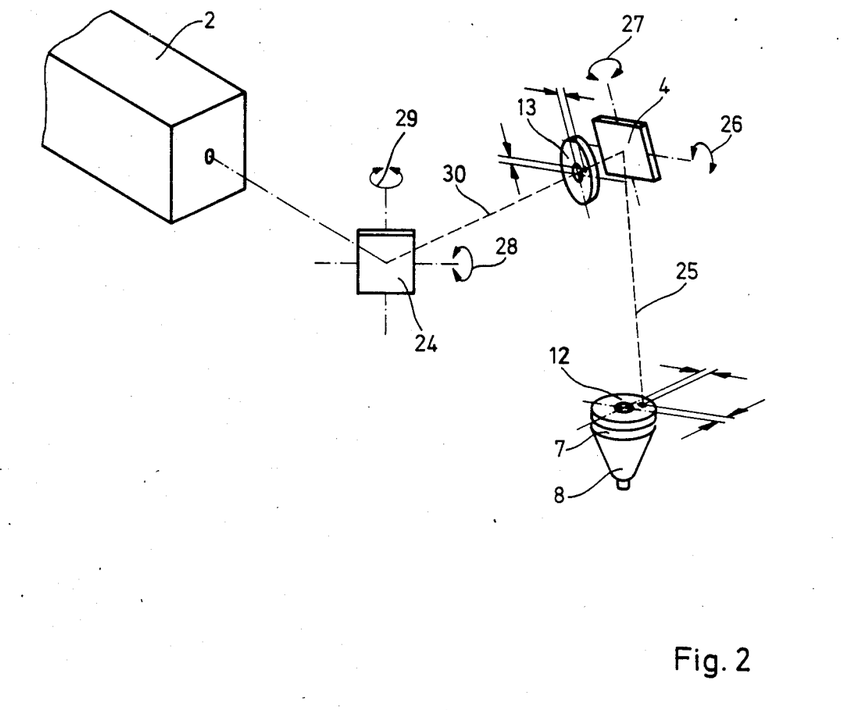
FIG. 2 is a diagrammatic view of an optical beam transmission system and aligning system embodying the present invention.

Turning now to FIG. 2, the specifically illustrated embodiment employs a pair of adjustable mirrors 4 and 24, each of which is pivotable about a pair of mutually perpendicular axes. In the instance of the mirror 24, it is pivotable about a horizontal axis as indicated by the double headed arrow 28 and also about a vertical axis as indicated by the double headed arrow 29. In the instance of the mirror 4, it is pivotable about a horizontal axis as indicated by the double headed arrow 26 and also about a vertical axis as indicated as by the double headed arrow 27. As shown, the laser beam 3 exiting from the laser generator 2 is horizontally reflected at a right angle by the mirror 24 into the path designated by the numeral 30, and it is again reflected by the mirror 4 at a right angle into the generally vertical path designated by the numeral 25.

In this embodiment, there are a pair of sensors 12 and 13 in the aligning system, each of generally annular configuration. The sensor 13 is disposed in the path 30 between the mirrors 24 and 4, and the sensor 12 is disposed in the path 25 adjacent the laser focusing head 7.

In the illustration, the laser beam 25 is misaligned along both X and Y axes relative to its optimum pathway through the aperture in the center of the sensor 12. Thus, an output signal is generated by the sensor 12 and transmitted to the control means 14 (illustrated in FIG. 1) to reflect the misalignment in the two axes. This misalignment may require pivotal movement of the mirror 4 about both of its pivotal axes, and this movement is illustrated by the arrows 26 and 27. Similarly, the path beam 30 is off axis along both X and Y axes and this information is transmitted in the form of signals from the sensor 13 to the control means 14. The output from the control means 14 effects rotation of the mirror 24 along both of its axes as indicated by the arrows 28 and 29, until the laser path is concentrically disposed within the aperture of the sensor 13. Before final alignment is effected, several such adjustments may be made. Alternatively, the control means may be programmed to combine the outputs from the two sensors 12 and 13 and to determine the optimum movement required for each of the mirrors 4 and 24 before effecting any such movement so that only one set of movements is ultimately made.

Figure 3:
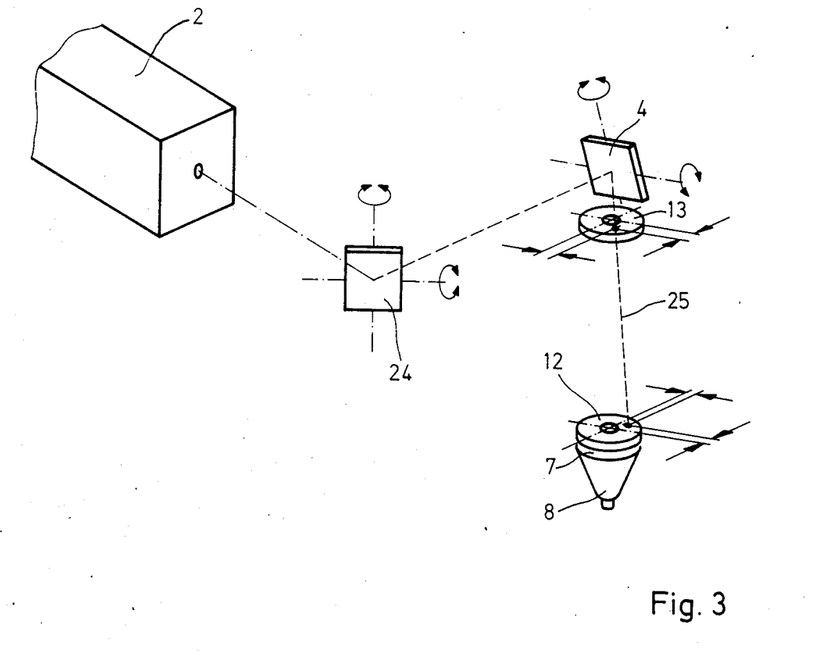
FIG. 3 is a view similar to FIG. 2 of another embodiment of laser beam transmission system and aligning system.

Turning now to FIG. 3, therein illustrated is an embodiment again employing a pair of adjustable mirrors 4 and 24 each of which is pivotable about a pair of axes which are perpendicular to each other. In this embodiment, the aligning system includes a pair of sensors 12 and 13 both disposed in the laser path 25 between the mirror 4 and the laser focusing head 7. The sensor 12 is utilized to determine the corrections required in the mirror 4, and the sensor 13 is utilized to determine the corrections required in the mirror 24. As indicated with respect to the embodiment of FIG. 2, the output signals from the sensors 12 and 13 may be combined and manipulated within the program of the control means 14 so as to generate a single set of corrective motions for the mirrors 4 and 24 to effect the necessary adjustment. It will be appreciated that the embodiment of FIG. 3 offers the advantage of encompassing all of the sensors and much of the control apparatus in the laser cutting head 9 and thus providing the opportunity for a more compact assembly.

Figure 4:
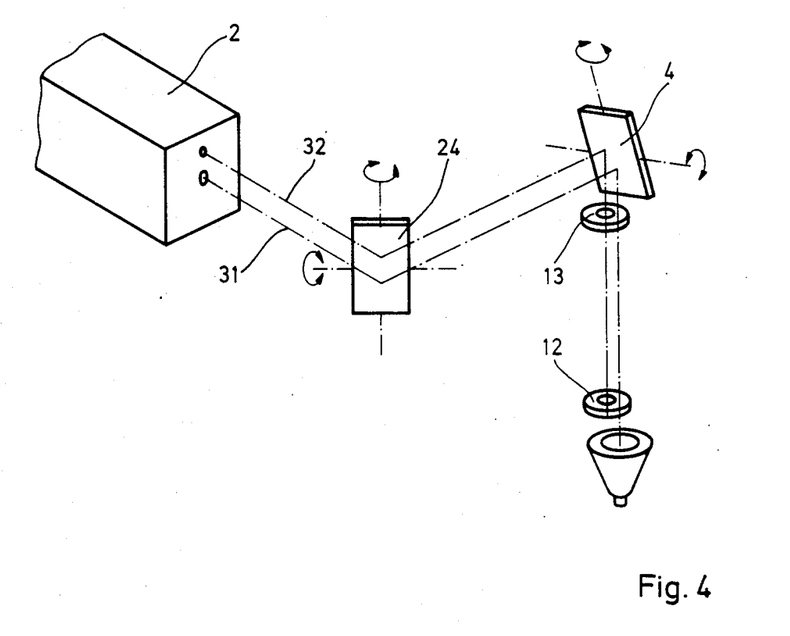
FIG. 4 is similar view of an apparatus using with a main laser beam and an auxiliary beam of lesser power.

Turning now to FIG. 4, the laser beam generator 2 generates a main beam 31 of high power which is actually used for processing the workpiece 10 and an auxiliary beam 32 of considerably lower power. The two beams 31 and 32 extend along absolutely parallel pathways and impinge upon the pair of adjustable mirrors 24 and 4. The mirror 4 reflects the beams 31 and 32 downwardly towards the focusing head 7. In this embodiment, a pair of sensors 12 and 13 are disposed in the path of the auxiliary beam 32 between the mirror 4 and the focusing head 7 so as to reduce thermal stresses upon them. The auxiliary beam 32 may be offset from the main beam 31 a distance sufficient so that the sensors 12 and 13 are disposed out of the pathway of the main beam 31 and are impinged upon only by the auxiliary beam 32. Because both the beams 31 and 32 are travelling along parallel pathways, misalignment of the auxiliary beam 32 as sensed by the sensors 12 and 13 can be utilized to effect its realignment and thereby that of the main laser beam 31 to ensure that it is properly directed into the optical center of the focusing head 7. In some instances when, particularly the main laser beam 31 is of a wave length normally invisible, the auxiliary laser beam 32 may be a separately generated laser beam in the visible spectrum to facilitate visual observation of the misalignment. Alternatively, the auxiliary beam 32 may be a reflected portion of the output of the laser generator 2 having only a small portion of its full power, in which case it will be of the same wave length.

Figure 5:
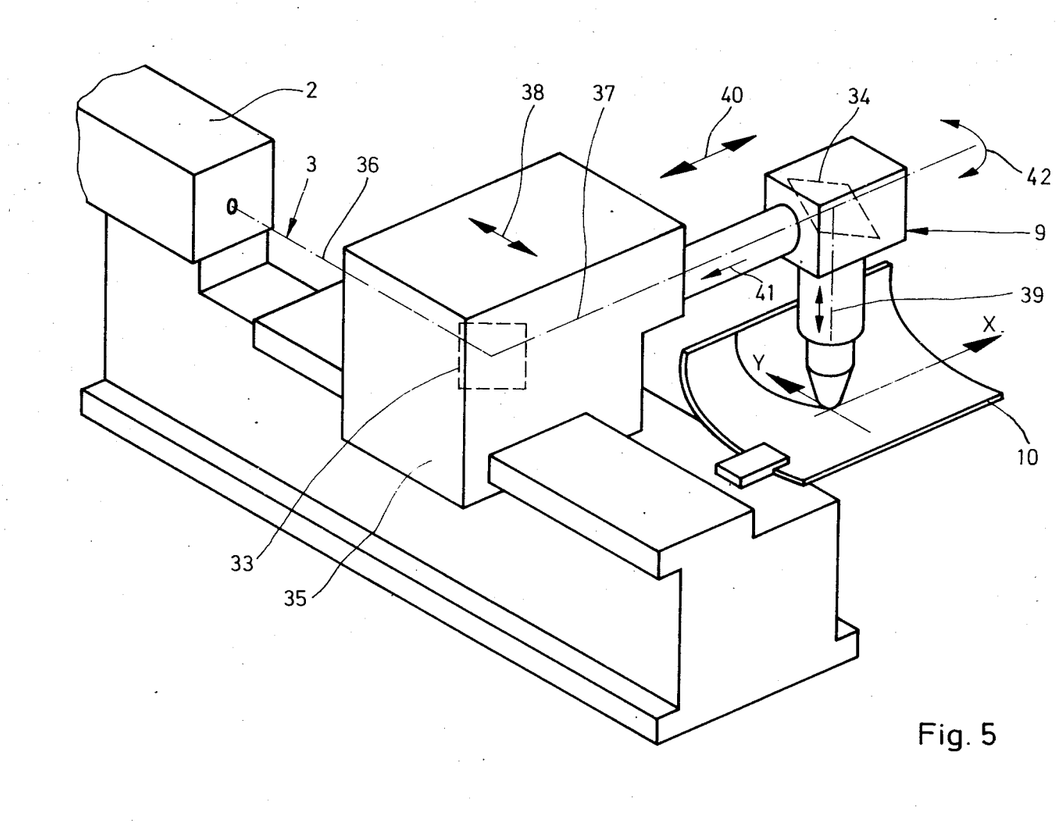
FIG. 5 is a partially diagrammatic view of a laser cutting machine embodying the present invention with a readily movable and adjustable laser beam assembly for working on workpieces of complex configuration.

Turning now to the apparatus of FIG. 5, the apparatus includes the laser resonator 2 which generates the laser beam 3 and a laser support mechanism 35 which is movable relative on the machine frame along an axis indicated by the double headed arrow 38 and which is parallel to the laser beam path 36. Disposed within the laser support mechanism 35 is a mirror 33 which is adjustably mounted as has been indicated hereinbefore with respect to the preceding embodiments. This mirror 33 effects horizontal reflection of the laser beam at a right angle into the path indicated by the numeral 37.

Supported on the laser support mechanism 35 is a laser cutting head 9 which is movable along an axis perpendicular to the axis of movement of the laser support mechanism 35, and this is effected by inward and outward movement of the tubular connecting element between the laser cutting head 9 and the laser support mechanism 35 as indicated by the arrow 41 thereon and the reciprocal motion indicated by the double headed arrow 40. Disposed at the upper portion of the laser cutting head 9 is the adjustable mirror 34 which directs the laser beam 3 into the path 39. The laser focusing head is mounted at the bottom of a tubular member which is movable vertically on the upper portion of the laser head 9 as indicated by the vertically extending double arrow thereon. Thus, the vertical disposition of the laser nozzle relative to a horizontal plane or to the work support table can be readily adjusted. The laser cutting head 9 is also pivotable about the horizontal axis of the tubular connector as indicated by the double headed arrow 42. The workpiece 10 is shown as gripped by a single clamp.

In this machine embodiment, the laser cutting head 9 can effect laser cutting of the workpiece in both the X and the Y directions by movement of the laser support 35 along its axis indicated by the double headed arrow 38 and by movement of the laser cutting head along the axis perpendicular thereto as indicated by the double headed arrow 40. When the workpiece is of non-planar configuration as illustrated, the laser cutting head 9 can be moved upwardly or downwardly as indicated by the double headed vertical arrow, and the laser head rotated about the horizontal axis as indicated by the numeral 42 so as to follow a curved contour as indicated by the curved line on the workpiece 10.

Figure 6:
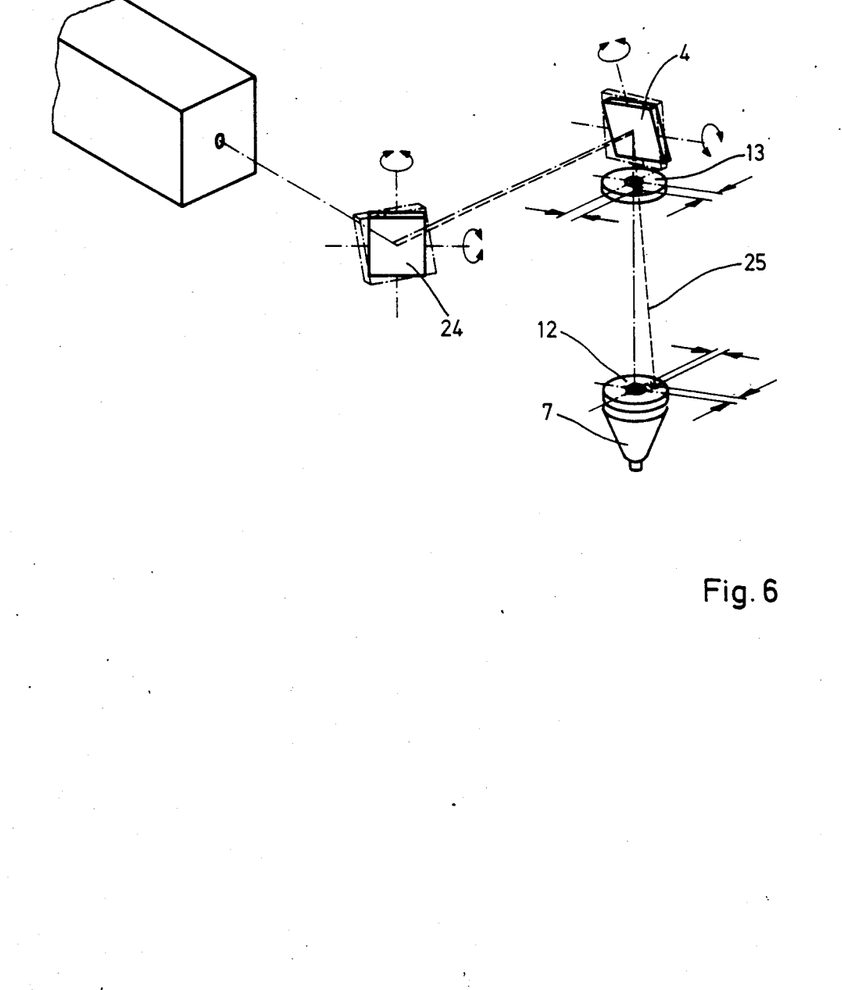
FIG. 6 is a diagrammatic view of a laser beam aligning system embodying the present invention showing the mirrors in solid line in one position and in phantom line in an alternate position.
Figure 7:
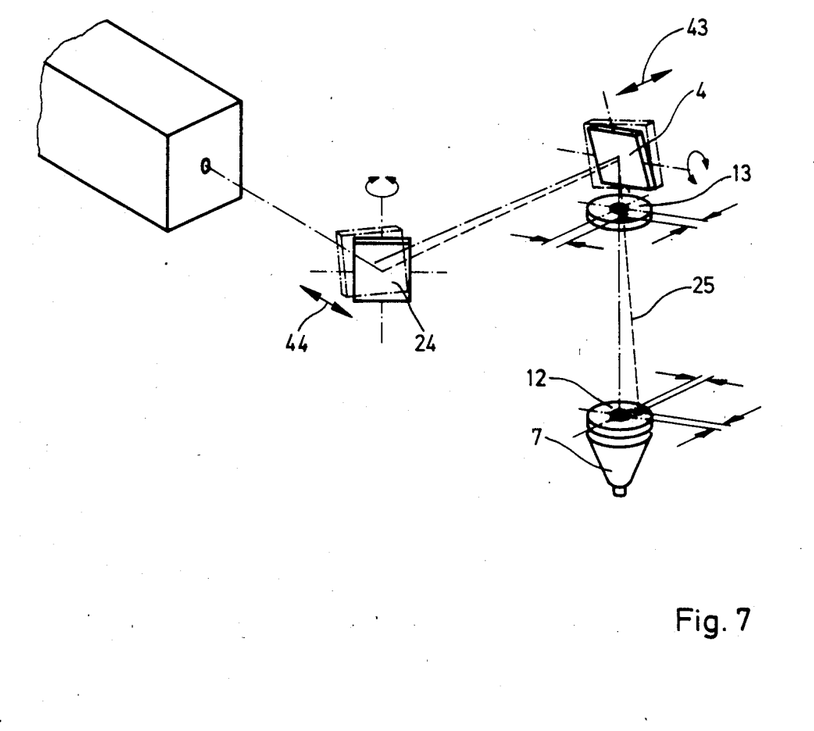
FIG. 7 is a view similar to FIG. 6.

Turning now to FIGS. 6 and 7, there are schematically illustrated in these views the adjustments of the mirrors 4 and 24 and the resultant beam paths. In both views, the optimum path is indicated in phantom (dot-dash) line and the deviating path in broken line. In FIG. 6, the mirrors 24 and 4 are both pivotably adjusted about both of their mutually perpendicular pivotal axes. In FIG. 7, the adjustment is effected by movement of the mirror 24 along the axis represented by the arrow 44 and by pivoting of the mirror 24 about its vertical axis as indicated by the double headed arrow, and by movement of the mirror 4 along the axis indicated by the double headed arrow 43 and by pivoting of the mirror 4 about the horizontal axis indicated by the double headed arrow.

The sensing devices within the aligning system may be of any suitable type including photosensors and thermosensors, and they are desirably disposed in a grid. When the laser beam impinges upon the sensors, the grid generates electrical signals that are transmitted to the control means to represent the condition at various points about the grid.

In the instance of photosensors, their electrical output may vary with the intensity of the light impinging thereon, and the signals from the various photosensors compared to determine the location of the center of the beam. This will require a laser beam in the visible spectrum.

Alternatively, the sensors may utilize a grid of thermistors which, when the laser beam impinges thereon, will be heated by the laser beam and generate signals which can be compared in intensity to indicate the position of the center of the laser beam. As will be appreciated, thermistors will not require a laser beam in the visible spectrum. In the instance of the thermistors, these may be located on the downstream or opposite surface of the sensor so that they respond to heating of the sensor body by the laser beam.

A preferred sensor construction is one providing a central aperture through which the main laser beam will normally extend, if the main laser beam is utilized for the actuation of the sensor. Since the power of the laser beam is Gaussian in intensity and includes peripheral fringe portions of relatively low power in addition to the high intensity center portion, four equidistantly spaced thermistors around the central aperture can be utilized to position fairly closely the laser beam by determining the differences in the intensity of the beam between opposed thermistors. However, more than two pairs of thermistors will also function effectively and can provide the signals being generated by the individual thermistors can be readily compared and processed in the control means.

As also indicated, the apparatus may use an auxiliary laser beam travelling in a parallel path, and the sensors may be disposed in its path and removed from that of the main laser beam. This has the advantage of preventing possible damage to the sensors by any major misalignment of the laser beam.

The control means should convert the signals from the sensors into a usable form which can be a visual readout of the position of the beam, or of the corrections required, for the operator to effect manually, or by manual control of motors. Preferably, the control means is a microprocessor which acts directly upon control motors for effecting automatic modification of the orientation of the mirrors, about pivotal axes, or about linear axes, or both, as indicated in the several figures. In addition thereto, the signals may also be converted into a visible output which can be read by the operator. The advantage to automatic operation is that such adjustment can be effected continuously or intermittently as needed during operation of the apparatus, particularly when complex workpieces are being processed such as indicated in of FIG. 5.

Although a single sensor may be utilized, it is preferable to employ two sensors cooperatively used to align two adjustable mirrors in the beam pathway. Both may be disposed between the two mirrors, or one after each of the mirrors. The control means should process the signals and preferably combine them to produce a combined output response to effect the necessary corrections.

As will also be appreciated, it may be undesirable to attempt to effect alignment of the mirrors while the main laser beam is being passed therethrough at full power. Many laser generators may be adjusted so as to reduce their output power to a small fraction of the normal operating power and thus avoid damage to the sensors when they are operational. Conveniently, this is done by one or more dichroic mirrors interposed in the laser beam path in the laser generator and which reflect into the beam dump a substantial portion of the light energy and allow only a small portion of the beam energy to pass therethrough. In still other types of apparatus, a cooled grid absorbing mechanism may be utilized to absorb a large portion of the energy of the laser beam. In still other embodiments, the laser generator may be pulsed at very low output energy and these pulsed bursts used to impinge upon the sensors to permit the desired alignment.

As has been indicated hereinbefore, many commercial industrial lasers utilize carbon dioxide and the beam is therefore invisible. With such devices, it may be desirable to have a secondary laser generator producing a low powered visible laser beam which will travel along a parallel path or which will be reflected into the normal path of the main laser beam to effect the desired alignment.

Moreover, in the interests of minimizing potential injury of the sensors were they to be contacted by the main laser beam, the sensors may be disposed so that they are movable from a position disposed well to one side of the main laser beam path and into a position in which they traverse the beam path for purposes of sensing the misalignment of the laser beam or of the auxiliary laser beam as the case may be.

As indicated in the several embodiments, the mirrors may be adjustable by movement in one or more axes, or by pivoting in one or more axes, or both. This movement can be effected manually or be effected by motor devices so as to provide automatic operation.

Moreover, in place of a separate microprocessor or calculator for receiving the output signals from the sensors and providing an output representative thereof to effect the desired correction, the information signals from the sensors can be transmitted directly to the numeric control system or computer that is controlling the overall laser apparatus, and its programming capabilities can be utilized to effect control of the various elements. Even when there is a separate microprocessor for the aligning system, it may be desirable to effect interconnection between such microprocessor and the main computer control. For example, in the embodiment of FIG. 6, the movement of the various components of the laser apparatus along the several axes and about the pivotal axis requires operation of the machine controls and possible concurrent adjustment of the mirrors to maintain the desired laser beam path.

From the foregoing detailed specification and attached drawings, it can be seen that the laser apparatus of the present invention provides a highly effective means for ensuring proper alignment of the laser beam in the lens of the focusing head. The alignment system may be fully automatic and operable during continued operation of the apparatus or intermittently brought into operation to effect periodic adjustment as required. The concepts of the present invention may be utilized to effect manual adjustment of the mirrors and the beam transmission system or automatic adjustment of the mirror. Moreover, since adjustment can be readily effected, relatively complex movements of the components of the laser apparatus can be accommodated.

Having thus described the invention, what is claimed is:

1. In laser apparatus for processing of workpieces, the combination comprising:
   (a) a laser beam generator;
   (b) a laser cutting head movably mounted in said laser apparatus at a distance from said laser beam generator for movement along at least two axes relative to said laser beam generator;
   (c) a laser beam focusing head disposed in said laser cutting head, said focusing head including a focusing lens and a nozzle through which the focused beam is directed;
   (d) a laser beam transmission system for transmitting the laser beam exiting the generator along a laser beam pathway to said beam focusing head including:
      (i) at least one adjustable mirror for effecting a reorientation of the beam in said pathway, said at least one adjustable mirror including a beam directing mirror in said laser cutting head in alignment with said beam focusing head to direct the laser beam directly into said focusing lens; and
      (ii) means mounting said beam directing mirror in said cutting head for movement in at least one axis; and
   (e) a laser beam aligning system including:
      (i) at least one sensing means at a point in said laser beam pathway between said beam directing mirror and said focusing lens, said sensing means being disposed adjacent said focusing lens and being actuatable by a laser beam impinging thereon to provide a signal indicative of deviation of the laser beam from its optimum path at said point in said pathway, and
      (ii) deviation responsive means responsive to the signal from said sensing means and providing an output for use in effecting movement of said beam directing mirror in said at least one axis to move the laser beam to its optimum path to said focusing head, whereby movement of said laser beam cutting head relative to said laser beam generator producing deviation of the laser beam from its optimum path to said focusing lens is sensed by said sensing means adajcent said focusing lens and said beam directing mirror is adjusted by said deviation responsive means to align said beam in its optimum path to said focusing lens.

2. The laser apparatus in accordance with claim 1 wherein said deviation responsive means includes visual indicating means providing information to the operator to effect movement of said at least one adjustable mirror to orient the laser beam into its optimum path to said beam focusing head.

3. The laser apparatus in accordance with claim 1 wherein said deviation responsive means includes automatically operable regulating means for automatically effecting movement of said at least one mirror to orient the laser beam into its optimum path to said beam focusing head.

4. The laser apparatus in accordance with claim 1 wherein said one mirror is movable in two axes that are perpendicular to each other.

5. The laser apparatus in accordance with claim 1 wherein said laser beam transmission system includes a second adjustable mirror mounted for movement in at least one axis and disposed between said laser generator and said cutting head.

6. The laser apparatus in accordance with claim 5 wherein said aiming system includes a second sensing means positioned in said pathway between said mirrors.

7. The laser apparatus in accordance with claim 1 wherein said aiming system includes a pair of sensing means in the pathway between said beam directing mirror and said focusing head, and wherein the signals generated by both of said sensing means are processed by said deviation responsive means to provide an output representing a combination of the information provided by the signals from said sensing means.

8. The laser apparatus in accordance with claim 1 wherein said laser cutting head which is movably mounted in said laser apparatus for movement along at least two axes which are perpendicular to each other.

9. The laser apparatus in accordance with claim 8 wherein said laser cutting head is supported on a support mechanism which is movable along one axis, and wherein said laser cutting head is movable relative to said support mechanism axis along an axis perpendicular to the first mentioned axis of movement.

10. The laser apparatus in accordance with claim 8 in which said laser cutting head is additionally movable along a third axis perpendicular to each of said two perpendicular axes.

11. The laser apparatus in accordance with claim 8 in which said laser cutting head is also pivotable about an axis parallel to one of said perpendicular axes.

12. The laser apparatus in accordance with claim 8 wherein said laser cutting head is supported on a support mechanism for movement relative thereto along one axis, and wherein said transmission system includes a second mirror in said support mechanism to effect a right angular reorientation of the laser beam from a second axis to said one axis, and said beam directing mirror in said laser cutting head effects an angular reorientation of the laser beam from said one axis to a path perpendicular to said one axis to said beam focusing head.

13. The laser apparatus in accordance with claim 12 wherein said laser cutting head is supported on said support mechanism for movement longitudinally along said one axis and also for pivotal movement about said one axis.

14. The laser apparatus in accordance with claim 1 wherein said laser beam generator has a pair of spaced exit apertures and generates a main beam of high power and an auxiliary beam of lower power, said beams being of the same wavelengths, said beam of lower power being offset from said main beam and extending through said transmission system along a parallel path offset a predetermined distance, said laser beam aligning system sensing said auxiliary beam and being responsive thereto.

15. The laser apparatus in accordance with claim 1 wherein said laser beam generator includes means for reducing the output power of the laser beam.

16. In a method for laser processing of workpieces, the steps comprising:
  (a) generating a laser beam;
  (b) moving a laser cutting head along at least one axis at a point spaced from the point of generation of said laser beam, said laser cutting head having a focusing lens for focusing the laser beam into an exit path through a nozzle and an adjustable beam directing mirror spaced therefrom for directing the laser beam to said focusing lens;
  (c) transmitting said laser beam along a beam transmission system including at least one adjustable mirror for effecting a reorientation of the direction of the beam, said one adjustable mirror including said beam directing mirror in said laser cutting head;
  (d) aligning said laser beam in said laser focusing on lens by sensing at a point in said pathway between said beam directing mirror and said focusing lens deviation of said beam from its optimum path at that point, and generating a signal indicative of such deviation; and
  (e) adjusting the position of said beam directing mirror in response to said signal to move said laser beam to its optimum path to said focusing lens.

17. The laser processing method of claim 16 wherein said laser beam is passed through a transmission system including at least a second mirror between said point of laser beam generation and said beam directing mirror and deviation of said laser beam is also sensed between said mirrors in said beam pathway and wherein the positions of both of said two mirrors are adjusted to move said laser beam to its optimum path to said focusing lens.

18. The laser processing method of claim 16 wherein said laser cutting head is moved along at least along one axis parallel to a portion of said beam pathway.

19. The laser processing method of claim 16 wherein said laser cutting head is pivoted about an axis parallel to a portion of said beam pathway.

20. The laser processing method of claim 16 wherein said laser cutting head is movable along at least along one axis parallel to a portion of said beam pathway, and wherein said laser cutting head is pivoted about an axis parallel to a portion of said beam pathway.

21. The laser processing method of claim 16 wherein a main laser beam and an auxiliary laser beam of lower power are generated, and said auxiliary beam is transmitted along a parallel pathway offset a predetermiend distance from that of said main beam, and wherein said auxiliary beam is sensed and used to effect the movement of said mirror and thereby of said main laser beam to its optimum path.

* * * * *